United States Patent
Mathi et al.

(10) Patent No.: US 9,156,627 B2
(45) Date of Patent: Oct. 13, 2015

(54) CLUTCH/BRAKE UNIT FOR AN ACCUMULATING CONVEYOR

(75) Inventors: Franz Mathi, Gleisdorf (AT); Jörg Bergmann, Kumberg (AT); Wilfried Waukmann, Raaba (AT)

(73) Assignee: Knapp AG, Hart bei Graz (AT)

( * ) Notice: Subject to any disclaimer, the term of this patent is extended or adjusted under 35 U.S.C. 154(b) by 0 days.

(21) Appl. No.: 14/353,390

(22) PCT Filed: Aug. 27, 2012

(86) PCT No.: PCT/EP2012/066580
§ 371 (c)(1),
(2), (4) Date: Apr. 22, 2014

(87) PCT Pub. No.: WO2013/060502
PCT Pub. Date: May 2, 2013

(65) Prior Publication Data
US 2014/0291118 A1     Oct. 2, 2014

(30) Foreign Application Priority Data
Oct. 27, 2011  (AT) .................................. A 1584/2011

(51) Int. Cl.
B65G 13/06   (2006.01)
B65G 47/26   (2006.01)
B65G 13/073  (2006.01)

(52) U.S. Cl.
CPC ............ *B65G 47/261* (2013.01); *B65G 13/073* (2013.01)

(58) Field of Classification Search
CPC .... B65G 47/261; B65G 13/073; B65G 13/07; B65G 13/071; B65G 47/268

USPC .......................... 198/781.01, 781.02, 781.03
See application file for complete search history.

(56) References Cited

U.S. PATENT DOCUMENTS

| | | | | |
|---|---|---|---|---|
| 4,421,224 A * | 12/1983 | Dingman | ................. | 198/781.02 |
| 4,706,801 A * | 11/1987 | Vessey | .................... | 198/781.02 |
| 6,772,874 B2 * | 8/2004 | Yamashita et al. | ........ | 198/781.03 |
| 6,868,961 B2 * | 3/2005 | Ehlert et al. | ............. | 198/781.04 |

(Continued)

FOREIGN PATENT DOCUMENTS

DE    43 33 625 A1    4/1995
DE    100 27 433 A1   11/2001

(Continued)

*Primary Examiner* — James R Bidwell
(74) *Attorney, Agent, or Firm* — Dickstein Shapiro LLP

(57) ABSTRACT

A clutch/brake unit for an accumulating conveyor for driving and for braking at least one roller which is provided for transporting a unit load on a roller path of the accumulating conveyor. The clutch/brake unit is driven continuously during operation via an endless drive traction mechanism on a driving roller and is configured, in an engaged operating state, for transmitting the rotational movement of the driving roller about an axis to a driven roller and, in a braking operating state, for slowing down the driven roller on a housing of the clutch/brake unit. The driven roller is connected to the roller via the endless traction mechanism. A compression spring displaces the driven roller along the axis in the direction of the housing in order to shift the clutch/brake unit into its braking operating state. A piston/cylinder unit integrated in the clutch/brake unit displaces the driven roller along the axis in the direction of the driving roller in order to shift the clutch/brake unit into its engaged operating state.

9 Claims, 2 Drawing Sheets

(56) References Cited

U.S. PATENT DOCUMENTS

| | | | |
|---|---|---|---|
| 7,021,456 B2 * | 4/2006 | Haan et al. | 198/781.01 |
| 7,290,649 B2 | 11/2007 | Wolkerstorfer | |
| 2006/0113166 A1 * | 6/2006 | Wolkerstorfer | 198/781.01 |

FOREIGN PATENT DOCUMENTS

| | | |
|---|---|---|
| DE | 10 2005 020 179 A1 | 11/2006 |
| DE | 10 2006 043 731 A1 | 3/2008 |
| EP | 1 314 663 A1 | 5/2003 |

* cited by examiner

CLUTCH/BRAKE UNIT FOR AN ACCUMULATING CONVEYOR

BACKGROUND OF THE INVENTION

1. Field of the Invention

The invention relates to a clutch/brake unit for an accumulating conveyor for driving and for braking at least one roller which is provided for transporting a unit load on a roller path of the accumulating conveyor by means of an endless traction mechanism, wherein the clutch/brake unit is driven continuously during operation via an endless drive traction mechanism on a driving roller and is configured, in an engaged operating state, for transmitting the rotational movement of the driving roller about an axis to a driven roller and, in a braking operating state, for slowing down the driven roller on a housing of the clutch/brake unit, the driven roller being connected to the roller via the endless traction mechanism.

2. Description of the Related Art

The document EP 1 314 663 A1 discloses such a clutch/brake unit in which both the first actuating means and the second actuating means are formed by an electrically operable clutch operating magnet. A transmission disk and the driven roller are connected to the axis of the clutch/brake unit in a torque-proof manner. The driving roller is rotatably supported by four ball bearings both toward the axis and toward the housing and is arranged between the transmission disk and the driven roller. In the braking operating state, a brake lining spring-mounted to the transmission disk is attracted toward a brake disk of the housing by one of the clutch operating magnets, whereby the brake lining slows down the transmission disk and, along with it, the driven roller. In the engaged operating state, a clutch lining spring-mounted to the transmission disk is attracted toward a clutch disk of the driving roller by the other clutch operating magnet, whereby the transmission disk and, along with it, the driven roller are driven by the driving roller. By the torque-proof connection of the transmission disk to the driven roller, the driven roller is, in each case, slowed down with the transmission disk or is taken along by the driving roller.

The known clutch/brake unit has the disadvantage that it is expensive and complex to manufacture due to its large number of individual parts. The spring-loaded mounting of the brake lining and of the clutch lining is subject to aging during extended service lives, for which reason slipping brakes and clutches and, as a result, failures of the clutch/brake unit have occurred due to a decreasing elastic force.

SUMMARY OF THE INVENTION

The invention is based on the object of providing a structurally simple, inexpensive and reliable clutch/brake unit in which the above disadvantages are avoided. According to the invention, said object is achieved in that first actuating means are configured for displacing the driven roller along the axis in the direction of the housing in order to shift the clutch/brake unit into its braking operating state and wherein second actuating means are configured for displacing the driven roller along the axis in the direction of the driving roller in order to shift the clutch/brake unit into its engaged operating state.

In this way, the advantage is obtained that, by a simple and reliably implementable displacement of the driven roller along the axis of the clutch/brake unit, the clutch/brake unit can be shifted into its braking operating state and its engaged operating state. At least the component parts of the transmission disk and the spring system of the brake and clutch linings of the structure according to the prior art can be omitted entirely in the clutch/brake unit according to the invention, since the function of the transmission disk is fulfilled also by the displaceable driven roller. As a result, the number of the component parts and in particular also the weight to be decelerated or accelerated during each braking process or acceleration process were significantly reduced with the mechanical strength remaining at least the same. For example, both tension or compression springs, piston/cylinder units with negative or excess pressure or also electromagnets may thereby serve as actuating means for displacing the driven roller.

However, it has turned out to be particularly advantageous to implement the first actuating means by a piston/cylinder unit operated with excess pressure and the second actuating means by a compression spring. In this way, it is achieved that the driven roller and thus the roller of the accumulating conveyor are decelerated by the compression spring outside of operating times or in case of a breakdown of the energy supply of the accumulating conveyor. Furthermore, the structure according to the invention has the advantage that the driven roller is either reliably decelerated by the strong brake pressure achievable by a strong compression spring or is reliably engaged by the strong pressing power achievable with the integrated piston/cylinder unit.

Providing the piston/cylinder unit integrated in the clutch/brake unit as the first and/or second actuating means has the advantage that only very little volume of compressed air is required for shifting the clutch/brake unit from one operating state to another operating state. Due to the lower demand for compressed air, the clutch/brake unit can be operated in a particularly energy-efficient manner.

Furthermore, it is particularly advantageous to use a material for the clutch and brake disks which dissipates an essential part of the clutch and braking energy, respectively, to be discharged during clutching and braking not by material abrasion, but by elastic and thermal energy conversion. Elastomers such as, e.g., polyurethane are particularly applicable for this. In a practical realization, the combination of the strong pressing power applied by the actuating means according to the invention and the use of a material having elastic properties for the brake and clutch disks achieves surprisingly good acceleration and braking values, even for the transport of heavy cargo, and permits a much longer service life than with conventional clutch/brake units.

It has also proven very advantageous that, in the clutch/brake unit according to the invention, the driven roller is provided close to the fastening means of the clutch/brake unit on the frame of the roller path and consequently in closer proximity than the driving roller. As a result, the entire width of the transport roller can be used for transporting the unit load.

Below, further advantageous embodiments of the system according to the invention are explained in further detail by way of the figures.

DETAILED DESCRIPTION OF THE PREFERRED EMBODIMENTS

Figure 1:
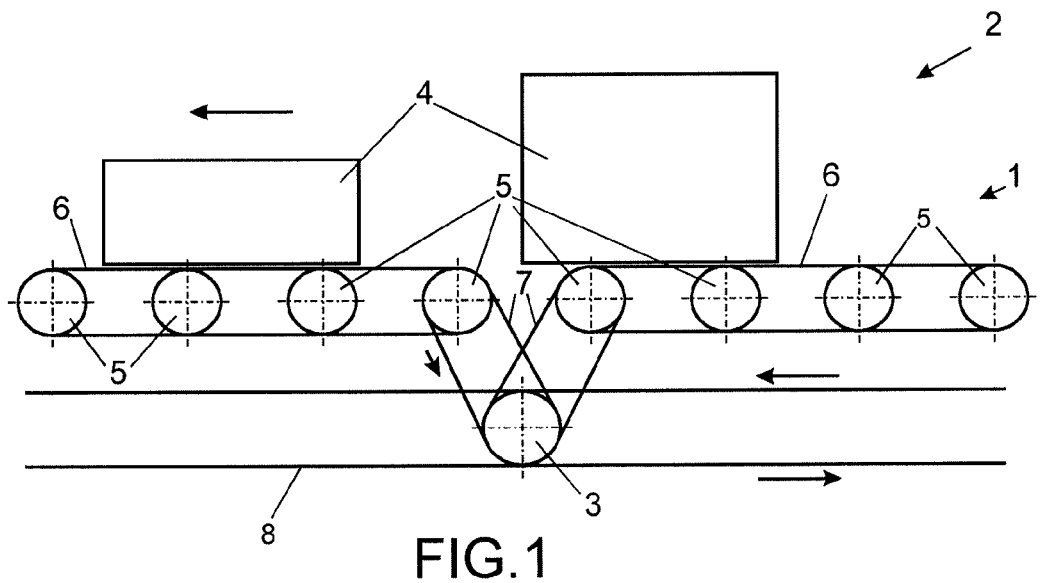
FIG. 1 schematically shows the roller path of an accumulating conveyor comprising a clutch/brake unit.

FIG. 1 schematically shows a section of a roller path 1 of an accumulating conveyor 2 comprising a clutch/brake unit 3. With the accumulating conveyor 2, a unit load 4, which is transported, for example, from a warehouse to picking stations, is guided from two conveyor belts onto one. In order to prevent a collision of the unit load 4, the unit load is accelerated and decelerated accordingly in certain sections of the roller path 1. The section of the roller path 1 illustrated in FIG. 1 comprises eight rollers 5, which are interconnected by endless traction mechanisms 6. A higher-ranking control device provides control information specifying when the rollers 5 of the roller path 1 should be decelerated or accelerated.

For driving the rollers 5 accordingly, the accumulating conveyor 2 comprises the clutch/brake unit 3 which is connected to the rollers 5 via two endless traction mechanisms 7 formed by V-ribbed belts. During operation, the clutch/brake unit 3 is continuously driven via an endless drive traction mechanism 8 on a driving roller 9, and, in an engaged operating state, the clutch/brake unit 3 is configured for transmitting the rotational movement of the driving roller 9 to a driven roller 11 by means of a clutch disk 10 and to the rollers 5 via the endless traction mechanism 7. The construction of the clutch/brake unit 3 is addressed in further detail by way of FIGS. 2 to 4.

Figure 2:
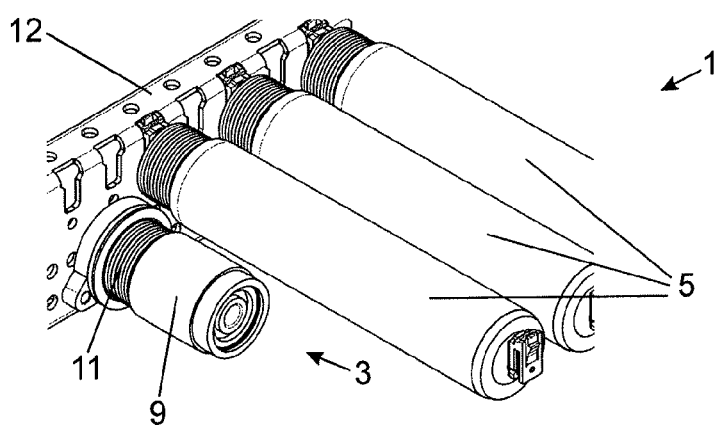
FIG. 2 shows three rollers and the clutch/brake unit of the roller path according to FIG. 1 in an oblique view.
Figure 3:
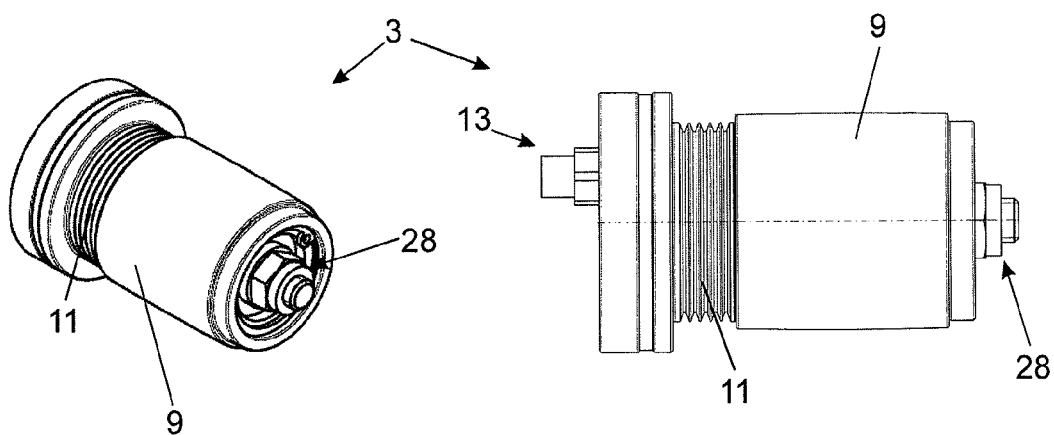
FIG. 3 shows the clutch/brake unit of the roller path according to FIG. 1 in a side view and in an oblique view.

FIG. 2 shows three rollers 5 and the clutch/brake unit 3 of the roller path 1 according to FIG. 1 in an oblique view. Both the rollers 5 and the clutch/brake unit 3 are fastened to a frame 12 of the roller path 1. For transporting the unit load 4, the rollers 5 are situated on one level, and, below said level, the clutch/brake unit 3 is fastened to the frame 12 by means of a screw/nut combination 13 constituting fasteners. The clutch/brake unit 3 is constructed such that the driven roller 11 is arranged between the fasteners and the driving roller 9 directly beside the frame 12 of the roller path 1. In this way, the advantage is achieved that essentially the entire width of the frame 12 can be used as a supporting surface of the rollers 5 for the unit load 4.

Figure 4:
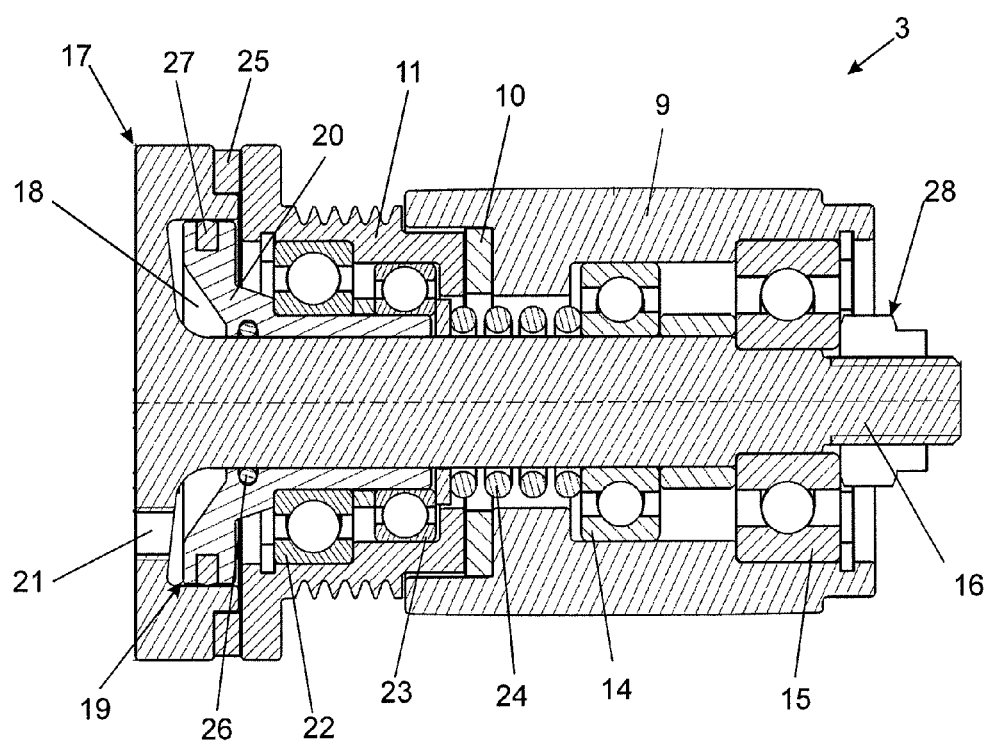
FIG. 4 shows the clutch/brake unit of the roller path according to FIG. 1 in a sectional view.

FIG. 4 shows the clutch/brake unit 3 of the roller path 1 according to FIG. 1 in a sectional view. The clutch/brake unit 3 comprises the driving roller 9, which is rotatably supported on the axis 16 by ball bearings 14 and 15. The drive traction mechanism 8 for driving the driving roller 9, which mechanism is formed, for example, by a flat belt or a toothed belt, is not illustrated in FIG. 4. As part of the housing 17 of the clutch/brake unit 3, the axis 16 is integrally formed with a cylinder 18 of a piston/cylinder unit 19. A part of the housing wall thereby forms the cylinder 18 in which the piston 20 is provided so as to be linearly displaceable on the axis 16. To a compressed air opening 21, a compressed air line is connected, the line pressure of which is generated by a compressor and is controlled by the higher-ranking control device with the aid of valves provided between the compressor and the compressed air opening 21.

On the piston 20, the driven roller 11 is provided so as to be rotatably supported by two ball bearings 22 and 23. A compression spring 24 presses on the linearly displaceable piston 20, whereby the driven roller 11 is pressed against a brake disk 25 on the housing 17 and the driven roller 11 is decelerated in the braking mode. If an appropriately large air pressure is directed into the cylinder 18 via the compressed air opening 21, the piston 20 slides against the spring force of the compression spring 24 and presses the clutch disk 10 against the driving roller 9. In said engaged operating state of the clutch/brake unit 3, the rotational movement of the driving roller 9 is passed on to the rollers 5 via the clutch disk 10, the driven roller 11 and the V-ribbed belts, which are not illustrated in FIG. 4. Sealing rings 26 and 27 seal the interior of the cylinder 18 toward the axis 16 and the inside wall of the housing 17. With just one screw nut 28, all parts of the clutch/brake unit 3 are screwed together, whereby repairs are easy to perform.

Furthermore, it is a particular advantage of the construction of the clutch/brake unit 3 that, apart from the clutch disk 10 made of a lightweight synthetic material, only the driving roller 9 and the driven roller 11 are rotating parts which are made of metal or a material of a similar mechanical strength and must be decelerated or accelerated in each braking and acceleration process. As a result, braking and accelerating can be accomplished very energy-efficiently and quickly. Providing the mechanical compression spring 24 and the piston/cylinder unit 19 for displacing the driven roller 11 has the advantage that, precisely with those two actuating means, large forces can be achieved cost-efficiently and easily which, as forces pressing against the brake disk 25 and the clutch disk 10, ensure a power transmission which is safe and proper. In addition, the piston/cylinder unit 19 integrated in the clutch/brake unit 3 allows a very compact design, whereby only the compressed air lines need to be connected for controlling the clutch/brake units 3 of the different sections of the roller path 1 via the higher-ranking control device.

It may be mentioned that the clutch/brake unit 3 could be operated also hydraulically, however, an implementation by means of a pneumatic cylinder 17 has turned out to be particularly advantageous.

The clutch disk 10 and the brake disk 25 are designed as non-positive friction clutches, the material of which dissipates the clutch and braking energy via elastic and thermal energy conversion virtually without any material removal on the friction surfaces. For this purpose, an elastomer, and in this connection particularly a polyurethane, was provided as the material of the clutch disk 10 and the brake disk 25. Said material is characterized in that, during the braking process or during clutching, it is deformed and then heated to a certain extent because of the friction, but virtually does not rub off, which would be the generally accepted principle of action for clutches and brake linings. In this way, a particularly long service life of the clutch/brake unit 3 is obtained without the need to replace the brake or clutch disk.

It may be mentioned that it might also be advantageous to use a thermoplast, and in this connection particularly a polyamide, as the material of the clutch disk 10 and the brake disk 25. But also the use of a thermosetting material as the material of the clutch disk 10 and the brake disk 25 has displayed beneficial effects.

In the clutch/brake unit 3, the brake disk 25 is fastened in the housing 17, and the clutch disk 10 is fastened in the driving roller 9. Similarly, however, the brake disk 25 and/or the clutch disk 10 might also be provided as fastened to the driven roller 11.

It would also be possible to design the compression spring 24 as a tension spring pulling the driven roller into its engaged operating state. By applying negative pressure in the cylinder, the driven roller could be guided into the braking operating state of the clutch/brake unit.

According to a further exemplary embodiment, it would also be possible to implement both the first actuating means and the second actuating means for displacing the driven roller along the axis through a piston/cylinder unit. In doing so, the supply of compressed air to the cylinder of the first actuating means might take place via a bore in the axis. In a particularly advantageous exemplary embodiment, the first and the second actuating means could also be constituted only by the one piston/cylinder unit 19, which is illustrated in FIG. 4. By means of compressed air in the cylinder 19, the driven roller 11 is shifted into its engaged operating state, and, by means of negative pressure in the cylinder 19, the piston/cylinder unit 19 is shifted into the braking operating state.

According to a further exemplary embodiment, the first actuating means and/or the second actuating means is/are formed by an electromagnet which displaces an anchor plate or the driven roller made of metal along the axis. Random combinations of the previously described actuating means might also be put together.

According to a further exemplary embodiment of the invention, the driven roller itself is made of a material for a non-positive friction clutch (e.g., polyurethane or polyamide), for which reason the provision of a separate brake disk and/or a separate clutch disk may advantageously be omitted. In this exemplary embodiment, the driven roller is pressed in the braking operating state by the first actuating means directly against the housing in order to decelerate the driven roller. In the engaged operating state, the driven roller is pressed by the second actuating means directly against the driving roller. It would also be possible to manufacture the housing at least in the area in which the driven roller is pressed against the housing and/or the driving roller from a material for a non-positive friction clutch. When it comes to the friction partners during braking and clutching, one of said parts could respectively be made of metal and the other one of the material for a non-positive friction clutch, or both friction partners could be made of the material for a non-positive friction clutch.

It may be mentioned that advantageously a traction mechanism allowing an axial displacement is used as the endless traction mechanism 7. Because if this, the rollers 5 are reliably driven also if the driven roller 11 is shifted into the braking operating state or the engaged operating state. For example, the V-ribbed belt 7, but also round belts or a chain, constitute such endless traction mechanisms.

It may be mentioned that, in this document, the term "accumulating conveyor" is to be interpreted to the effect that, for example, a band conveyor or belt conveyor is also meant by this term.

The invention claimed is:

1. A clutch/brake unit for an accumulating conveyor for driving and for braking at least one roller which is provided for transporting a unit load on a roller path of the accumulating conveyor by means of an endless traction mechanism, wherein the clutch/brake unit is driven continuously during operation via an endless drive traction mechanism on a driving roller and is configured, in an engaged operating state, for transmitting the rotational movement of the driving roller about an axis to a driven roller and, in a braking operating state, for slowing down the driven roller on a housing of the clutch/brake unit, the driven roller being connected to the roller via the endless traction mechanism, wherein first actuating means are configured for displacing the driven roller along the axis in the direction of the housing in order to shift the clutch/brake unit into its braking operating state and wherein second actuating means are configured for displacing the driven roller along the axis in the direction of the driving roller in order to shift the clutch/brake unit into its engaged operating state, and wherein the first actuating means comprises a compression spring and the second actuating means comprises a piston/cylinder unit integrated in the clutch/brake unit, the piston of which rotatably supports the driven roller via at least one ball bearing while being guided linearly along the axis of the clutch/brake unit, and wherein the clutch/brake unit is guided with a depressurized cylinder into its braking operating state.

2. A clutch/brake unit according to claim 1, characterized in that a brake disk is provided between the driven roller and the housing, and/or a clutch disk is provided between the driven roller and the driving roller.

3. A clutch/brake unit according to claim 1, characterized in that the first actuating means are configured in the braking operating state for pressing the driven roller against the housing, and/or the second actuating means are configured in the engaged operating state for pressing the driven roller against the driving roller.

4. A clutch/brake unit according to claim 1, characterized in that the clutch disk and/or the brake disk and/or the driven roller and/or the driving roller and/or the housing consist(s) of a material for a non-positive friction clutch which dissipates the clutch and/or braking energy via elastic and thermal energy conversion virtually without any material removal on the friction surfaces.

5. A clutch/brake unit according to claim 4, characterized in that an elastomer, and in this connection particularly a polyurethane, or a thermoplast, and in this connection particularly a polyamide, is provided as the material of the clutch disk and/or the brake disk and/or the driven roller and/or the driving roller and/or the housing.

6. A clutch/brake unit according to claim 1, characterized in that fasteners for fastening the clutch/brake unit to a frame of the roller path in an operating position underneath the rollers are provided, with the driven roller being provided closer to the fasteners than the driving roller.

7. A clutch/brake unit according to claim 1, characterized in that a traction mechanism allowing an axial displacement is provided as the endless traction mechanism, wherein in particular one of the following traction mechanisms is provided: V-ribbed belt; round belt; chain.

8. A clutch/brake unit according to claim 1, characterized in that the cylinder of the piston/cylinder unit is designed as a pneumatic cylinder and that the piston is sealed toward the housing and the axis by means of sealants, in particular sealing rings.

9. An accumulating conveyor comprising a roller path for transporting a unit load, characterized in that, per section of the roller path, at least one clutch/brake unit according to claim 1 is provided.

* * * * *